(12) United States Patent
Ballew

(10) Patent No.: US 11,072,031 B1
(45) Date of Patent: Jul. 27, 2021

(54) VARIABLE ANGLE CUTTING DECK FOR METAL CUTTING CHOP SAWS

(71) Applicant: Tony J. Ballew, Livingston, MT (US)

(72) Inventor: Tony J. Ballew, Livingston, MT (US)

( * ) Notice: Subject to any disclaimer, the term of this patent is extended or adjusted under 35 U.S.C. 154(b) by 0 days.

(21) Appl. No.: 16/748,743

(22) Filed: Jan. 21, 2020

Related U.S. Application Data

(60) Provisional application No. 62/794,989, filed on Jan. 21, 2019, provisional application No. 62/797,348, filed on Jan. 27, 2019, provisional application No. 62/811,564, filed on Feb. 28, 2019.

(51) Int. Cl.
*B23D 47/02* (2006.01)
*B23D 45/04* (2006.01)

(52) U.S. Cl.
CPC ........... *B23D 47/02* (2013.01); *B23D 45/044* (2013.01)

(58) Field of Classification Search
CPC ........ B23D 47/02; B23D 45/044; B27B 5/07; B27B 5/188; B27B 5/208
See application file for complete search history.

(56) References Cited

U.S. PATENT DOCUMENTS

| | | | | |
|---|---|---|---|---|
| 101,760 A * | 4/1870 | Neeb | ..................... | B23D 45/044 83/468.3 |
| 1,765,733 A * | 6/1930 | Olsen | ...................... | B27B 5/208 83/471.3 |
| 1,831,124 A * | 11/1931 | Koster | ..................... | B27B 25/10 83/435.12 |
| 2,619,998 A * | 12/1952 | Okamuro | ............... | B23Q 3/005 144/253.8 |
| 4,461,196 A * | 7/1984 | Schramm, II | ............ | B27G 5/02 83/13 |
| 4,466,601 A * | 8/1984 | Raines | ................... | B23B 47/287 248/455 |
| 5,161,443 A * | 11/1992 | Huang | ................... | B23D 47/04 83/169 |
| 5,483,858 A * | 1/1996 | Chen | ....................... | B23D 47/04 269/303 |
| 5,634,748 A * | 6/1997 | Brazell | .................... | B23B 39/00 408/103 |
| 5,720,096 A * | 2/1998 | Dorsey | .................. | B23D 47/04 269/204 |
| 5,765,273 A * | 6/1998 | Mora | ........................ | B23Q 1/03 108/4 |

(Continued)

*Primary Examiner* — Sean M Michalski

(57) ABSTRACT

An improved chop saw cutting deck is moveably attached to a chop saw base with a hinge mechanism. The axis of the hinge mechanism is perpendicular to the vertical axis of the chop saw's cutting wheel, thereby allowing a change to the angle of inclination between the cutting wheel and materials placed on the cutting deck. For certain material profiles, this alternate inclination angle presents a smaller material surface area to the cutting wheel, and translates to cooler, faster, and more efficient abrasive cutting action. The cutting deck is supported in its inclined position by a deck support means, and may be reconfigured back to a horizontal orientation for effective cutting of various other material profiles. In addition, the preferred location of the hinge axis provides a consistent, lateral line of elevation across the cutting deck, thereby assuring continuous contact of elongated materials with supplemental material supports, such as sawhorses, throughout the cutting deck's range of motion.

10 Claims, 6 Drawing Sheets

(56) References Cited

U.S. PATENT DOCUMENTS

Figure 1:
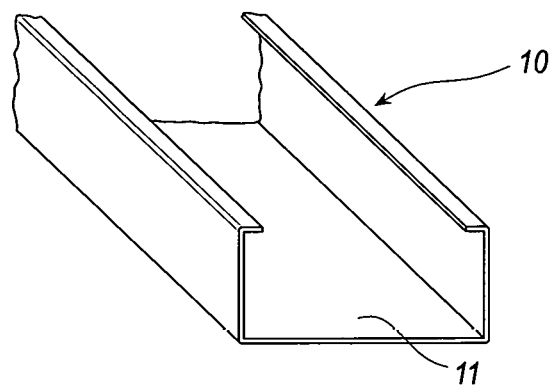

| | | | | |
|---|---|---|---|---|
| 6,775,917 B1* | 8/2004 | Campbell | ............... | B27B 25/10 33/415 |
| 6,857,829 B2* | 2/2005 | Newton | ............ | B23Q 11/0046 408/67 |
| 6,866,568 B1* | 3/2005 | Liao | ...................... | B23D 45/042 125/13.01 |
| D550,729 S * | 9/2007 | Wikle | ........................ | D15/133 |
| 7,905,167 B2* | 3/2011 | Ushiwata | ............ | B23D 45/027 83/581 |
| 7,930,961 B2* | 4/2011 | Kozina | .................. | B27B 27/08 83/468.3 |
| 8,393,833 B1* | 3/2013 | Juranek | ............... | B23D 45/003 409/93 |
| 8,549,970 B2* | 10/2013 | Stone | ...................... | B27B 27/08 83/471.3 |
| 8,631,733 B2* | 1/2014 | Imamura | ............... | B23D 47/12 83/471.3 |
| 8,646,368 B1* | 2/2014 | Clark | ..................... | B27G 5/023 83/468.3 |
| 8,898,913 B1* | 12/2014 | Lones | ..................... | B28D 1/04 30/375 |
| 8,919,235 B2* | 12/2014 | Sudou | .................. | B23D 59/007 83/471.2 |
| 10,105,865 B2* | 10/2018 | Courtney | ............... | B27G 5/026 |
| 10,245,750 B2* | 4/2019 | Everhart | ............... | B27B 27/08 |
| 2002/0007712 A1* | 1/2002 | Hayashizaki | ........... | B23D 47/04 83/454 |
| 2002/0127960 A1* | 9/2002 | Brazell | ................ | B23D 45/042 451/280 |
| 2003/0024364 A1* | 2/2003 | Chang | .................... | B23D 47/04 83/471.2 |
| 2004/0154450 A1* | 8/2004 | Vallone | ..................... | B27G 5/02 83/581 |
| 2004/0163517 A1* | 8/2004 | Chang | .................... | B23D 47/04 83/440 |
| 2006/0266190 A1* | 11/2006 | Saitou | .................. | B23D 45/044 83/581 |
| 2008/0210072 A1* | 9/2008 | Chang | .................... | B23D 47/02 83/471.3 |
| 2016/0243631 A1* | 8/2016 | Brewster | .............. | B23D 59/003 |
| 2017/0189976 A1* | 7/2017 | Lin | ..................... | B23D 45/044 |
| 2017/0334092 A1* | 11/2017 | Wung | ................... | B28D 1/042 |
| 2017/0341258 A1* | 11/2017 | Chang | .................. | B23D 45/044 |
| 2018/0071955 A1* | 3/2018 | Rybka | ..................... | B27B 9/02 |
| 2019/0015913 A1* | 1/2019 | Ku | ......................... | B27B 27/06 |

* cited by examiner

VARIABLE ANGLE CUTTING DECK FOR METAL CUTTING CHOP SAWS

CROSS-REFERENCE TO RELATED APPLICATIONS

This application claims the benefit of multiple provisional applications:
Application No. 62/794,989 filed Jan. 21, 2019;
Application No. 62/797,348 filed Jan. 27, 2019; and
Application No. 62/811,564 filed Feb. 28, 2019; all filed by the present inventor.

FEDERALLY SPONSORED RESEARCH

Not Applicable

SEQUENCE LISTING OR PROGRAM

Not Applicable

BACKGROUND OF THE INVENTION

Field of Invention

This invention relates to metal cutting power tools, specifically to metal cutting chop saws.

Prior Art FIGS. 1-5 and 6A

In the field of steel stud framing, the steel studs 10 to be used are usually ordered in bunks of standard length and are then cut to custom lengths at the jobsite. The most common tool for cutting steel studs is a metal cutting cut-off saw, or chop saw 12, FIG. 2. Chop saws employ an abrasive disc, or wheel 15, which is mounted to and driven by a motor (not shown). A motor mount assembly 18 provides a means to mount the motor and wheel to a base 13 in such a fashion that the wheel may be pivoted up or down on a vertical axis from a pivot point 18'. The vertical motor axis and wheel axis are at a right angle to a horizontally referenced cutting deck 14 of base 13. The cutting deck 14 provides a planar surface on which to support the materials, or stock, to be cut, and employs a fence 19 and a clamp assembly comprising a head 20, block 21, screw 22, and handle 23 which secure the stock against unwanted movement. An elongated slot 24 (FIG. 6A) in the cutting deck allows the perimeter of wheel 15 to pivot below the surface of the cutting deck, as seen in FIG. 3, thus allowing the stock to be completely cut through.

To cut steel studs to specific length, a stud, or multiple studs, is placed on the cutting deck below wheel 15 and against the fence 19 at the desired cut location, as in FIG. 4A. The motor is then energized, and both the motor and its spinning, abrasive wheel are pivoted downward against the stud. Ideally, the abrasion between the wheel and the stud rapidly wears away the steel of the stud, thus resulting in a cut.

Figure 4A:
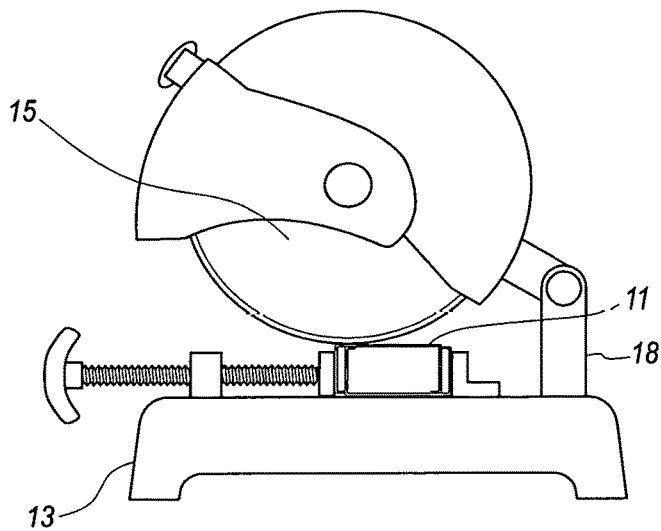
Figure 4B:
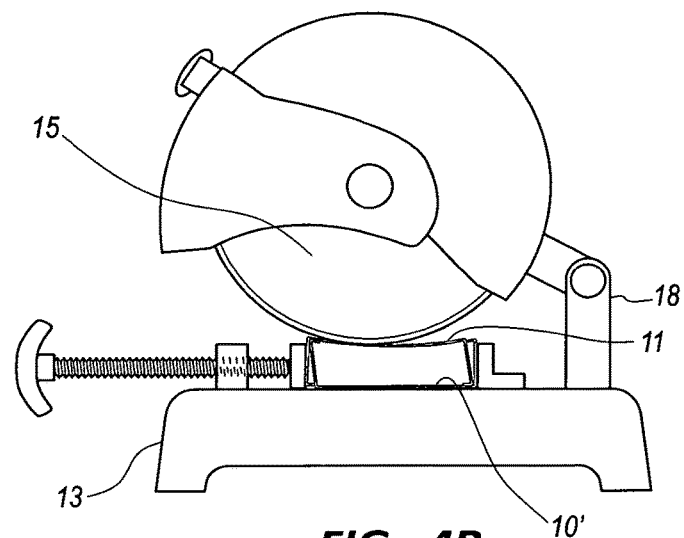

Until now, the configuration of chop saws dictated that studs were placed in an orientation to the wheel as is shown in FIGS. 4A and 4B. This seemingly benign horizontal stud orientation has, in fact, led to immeasurable increases in man-hour expenditures, unnecessary physical exertion, and waste of natural resources. To better understand the deficits of this orientation, it is important to note the geometry of a prior art chop saw. On narrower studs in the 3⅝ inch to 4 inch range, as in FIG. 4A, the contact point of the abrasive wheel is near the front edge of a stud. This presents a relatively small surface area from which to effectively initiate a cut. Wider studs 10' with widths of 6 inches and greater, however, present a flat surface to the wheel's contact point, as seen in FIG. 4B, even with an optimally set fence 19. Due to the wheel's diameter and position, the contact area between the wheel and the metal is effectively increased to the degree that the heat generated from added friction causes the surrounding area to become red-hot.

When the temperature of the surrounding steel reaches a red-hot point, abrasive cutting action is minimized, as evidenced by a reduction or absence of sparks. This rapid temperature increase and reduced cutting ability is even more pronounced with heavier gauge stock, when an entire bundle of studs is being cut together, or where thin-gauge wider studs 10' allow deflection of web 11 to the wheel curvature as in FIG. 4B.

To overcome this lack of cutting action, a typical chop saw operator will increase the downward force of the wheel. Such an action usually powers the wheel through thinner stock. However, thicker materials require even greater time and energy expenditures to accomplish the task, and in some cases, the cutting action simply ceases. As such, the geometry of prior art chop saws requires additional time spent per cut, unnecessary physical exertion on the part of the operator, and increased use of electricity, all while subjecting the motor to prolonged, added bearing pressure and potential premature failure.

A rare response of some operators when a stock reaches a red-hot state is to release pressure from the wheel in order to cool the stock and then to reapply pressure, alternating between the two until the material is cut. While this remedy is less physically demanding for the operator and easier on the motor, a cumulative loss of man-hours and unnecessary use of natural resources persist.

Although the prior-art orientation between the cutting deck and wheel is useful for cutting some profiles such as inverted angle iron 25 (FIG. 5), nowhere among the prior art chop saws has been found a means to attain an alternate, effective inclination angle to reduce a stock's surface area contact with the wheel.

Objects and Advantages

Accordingly, several objects and advantages of the present invention are to provide a chop saw cutting deck
(a) which may be configured to provide an inclination on which stock may securely rest and by which to reduce the contact area and associated frictional resistance between a chop saw cutting wheel and certain materials of specific gauge or profile, thereby (i) decreasing the time required per cut, (ii) decreasing operator fatigue, (iii) reducing wear and tear of equipment, and (iv) reducing amp/hour requirements and use of natural resources;
(b) which allows unhindered use of the prior-art cutting deck's fence and clamp assembly; and
(c) which may also be configured to the prior-art horizontal orientation for effective cutting of various other material profiles.

Further objects and advantages of my invention will become apparent from a consideration of the drawings and ensuing description.

SUMMARY

In accordance with the present invention a chop saw base supports a variable-angle cutting deck assembly on which are located prior art chop saw components comprising a slot, a fence, and a clamp assembly. The deck assembly is hinged to the base along a lateral axis perpendicular to the cutting wheel axis in such fashion as to provide an inclined orientation of the deck and the stock thereon. The resultant inclination of specific material profiles presents a smaller surface area to the cutting wheel, thereby reducing friction and providing optimum cutting efficiency. The chosen location of the preferred embodiment's hinge pivot axis further provides a consistent line of elevation across the cutting deck throughout a range of cutting deck angles. This consistent line of elevation assures that some portion of the stock remains in contact with supplemental material supports, such as sawhorses, without the need for elevation adjustments to the supplemental supports subsequent to changes to the cutting deck inclination angle. The cutting deck assembly is secured into an inclined orientation by a deck support means. When horizontal deck orientation is desired, the cutting deck assembly is lowered into the base.

DRAWINGS—FIGURES

Figure 2:
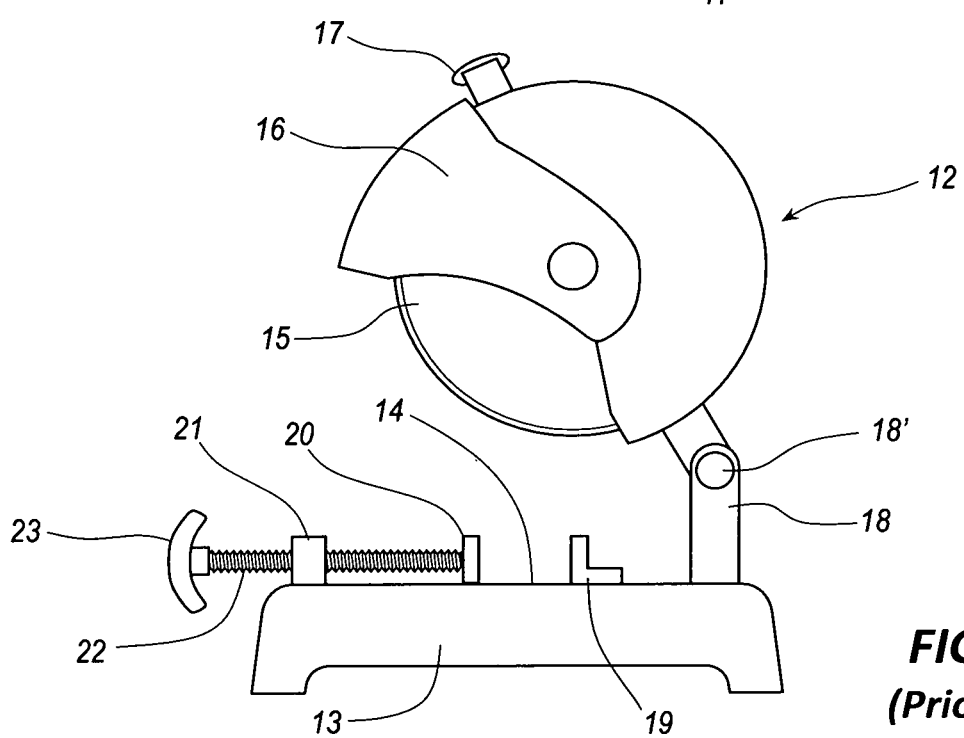
Figure 3:
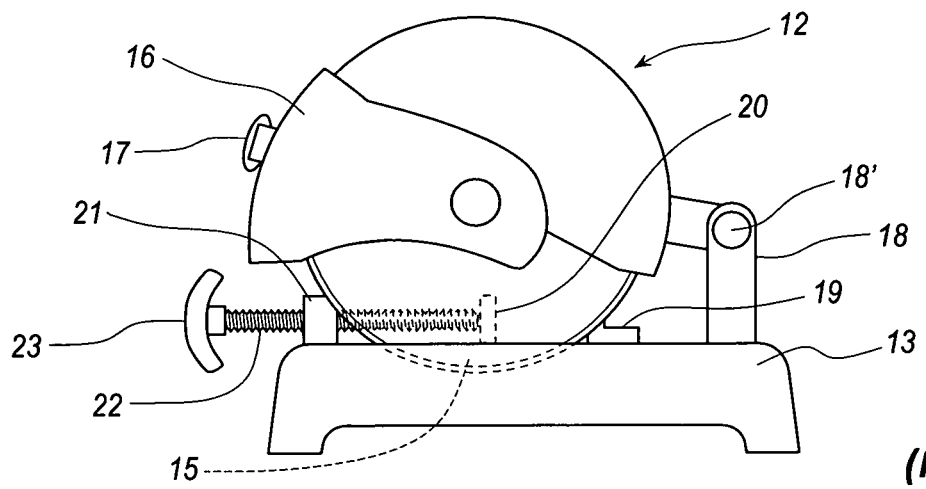
Figure 5:
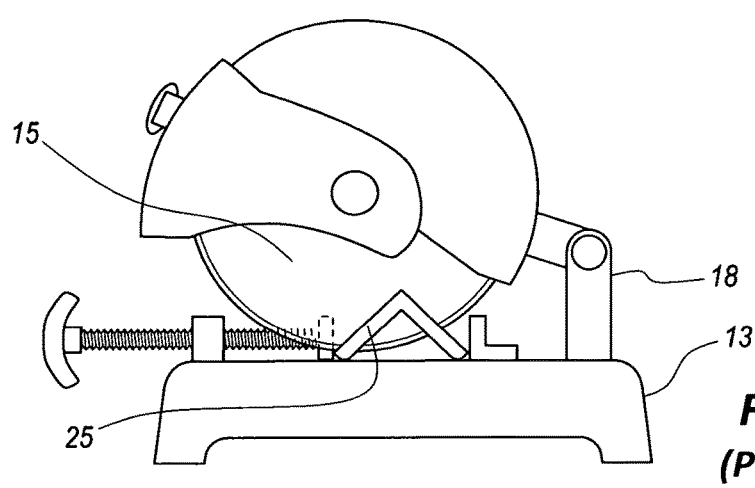
Figure 6B:
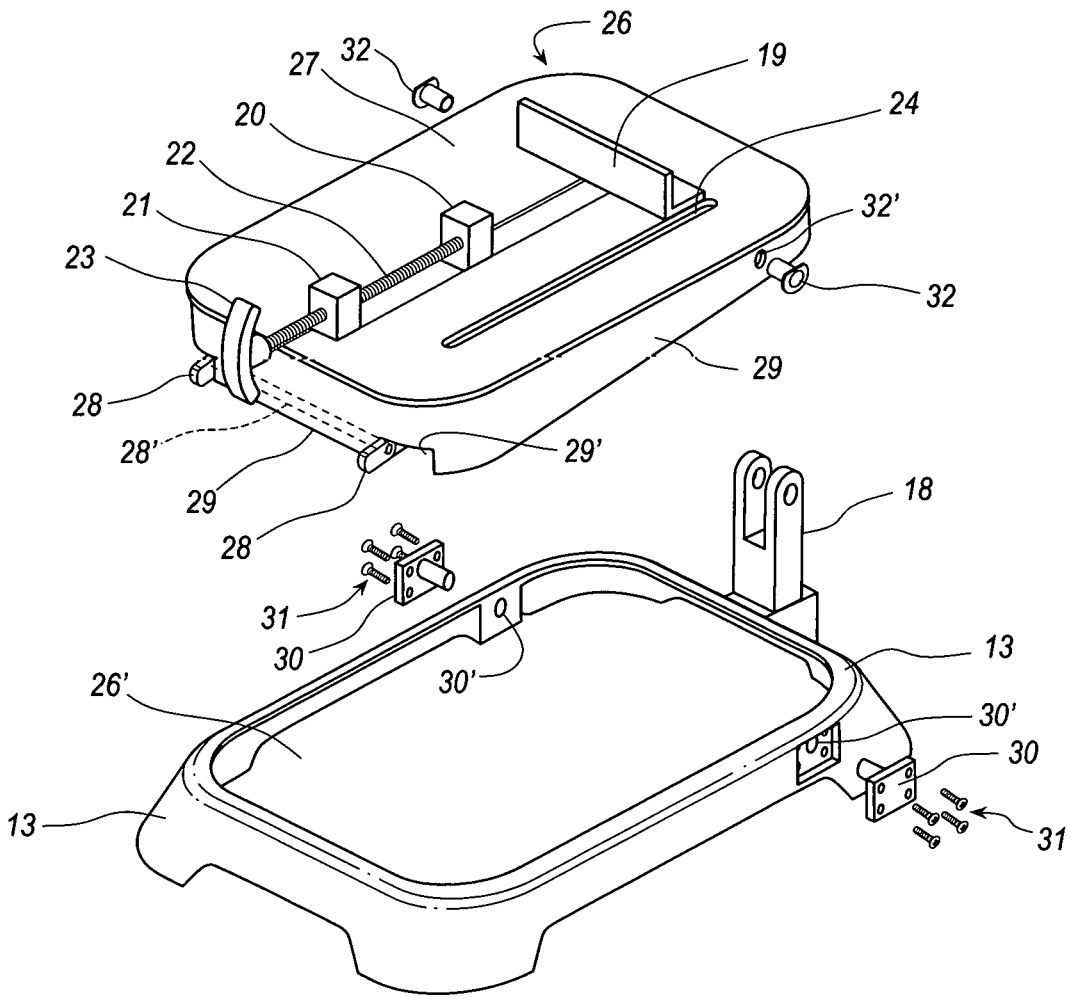
Figure 6B:
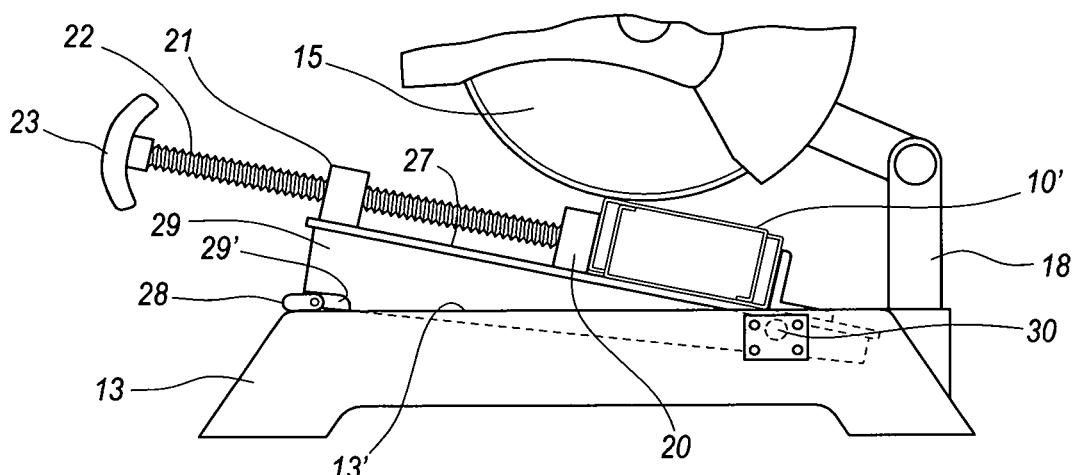
Figure 7:
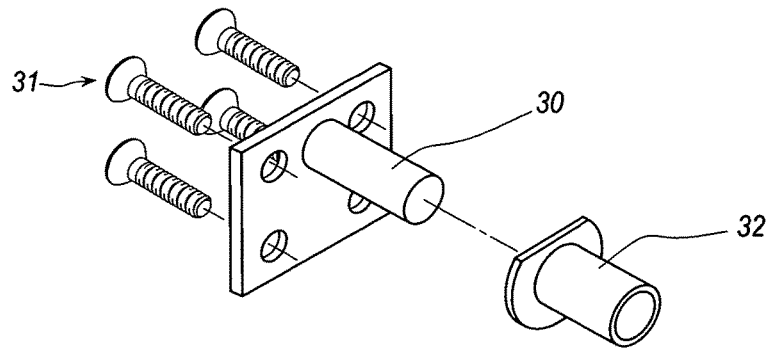
Figure 8A:
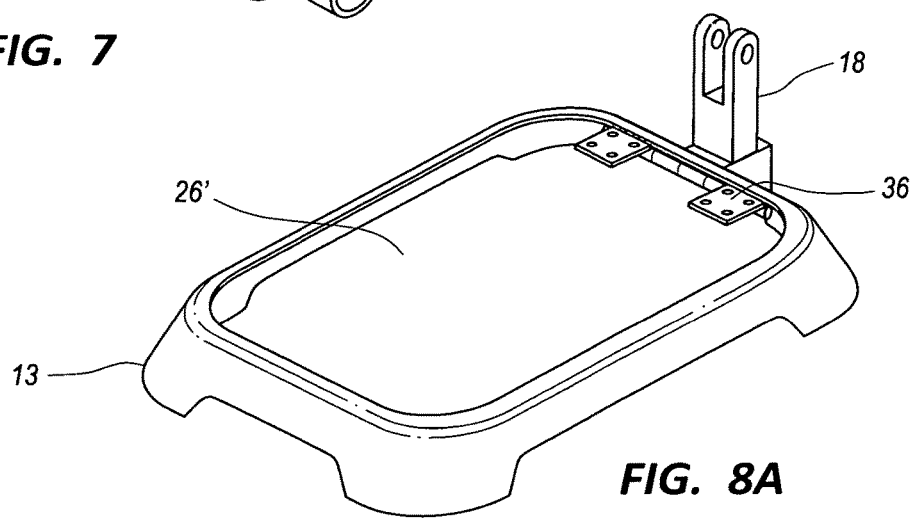
Figure 8B:
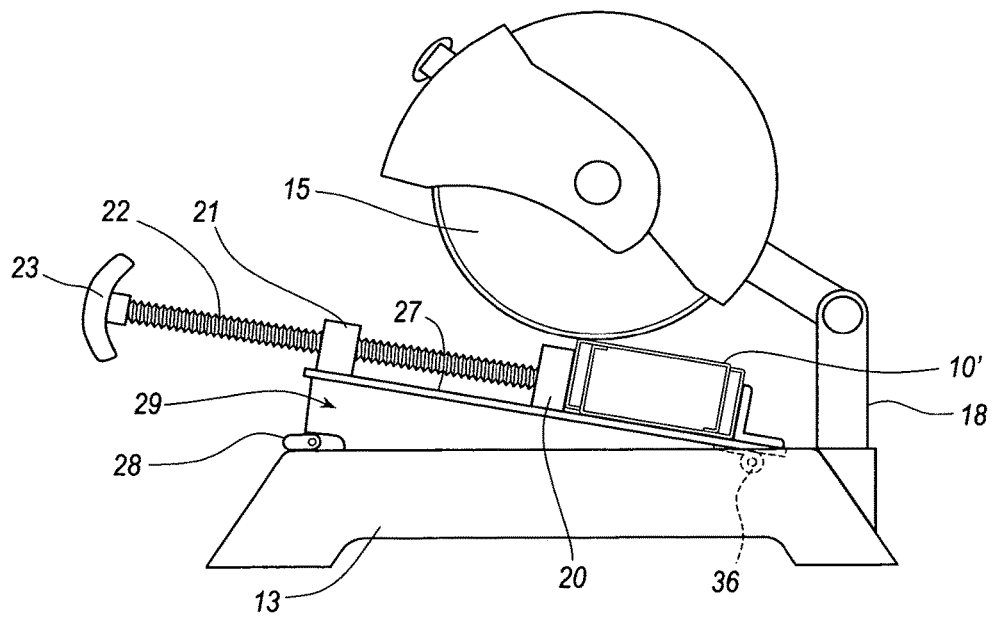
Figure 9A:
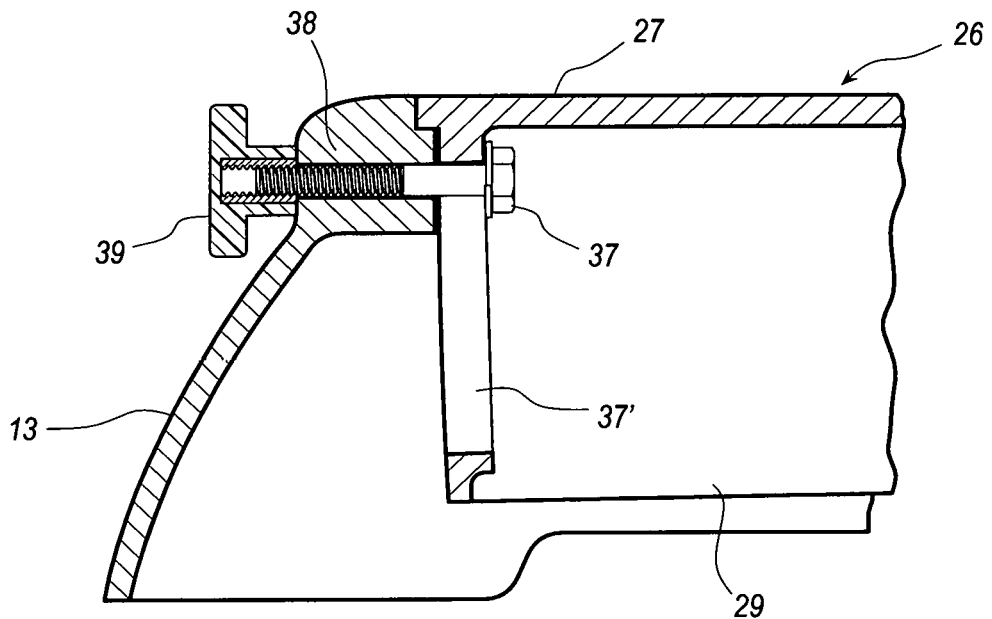
Figure 9B:
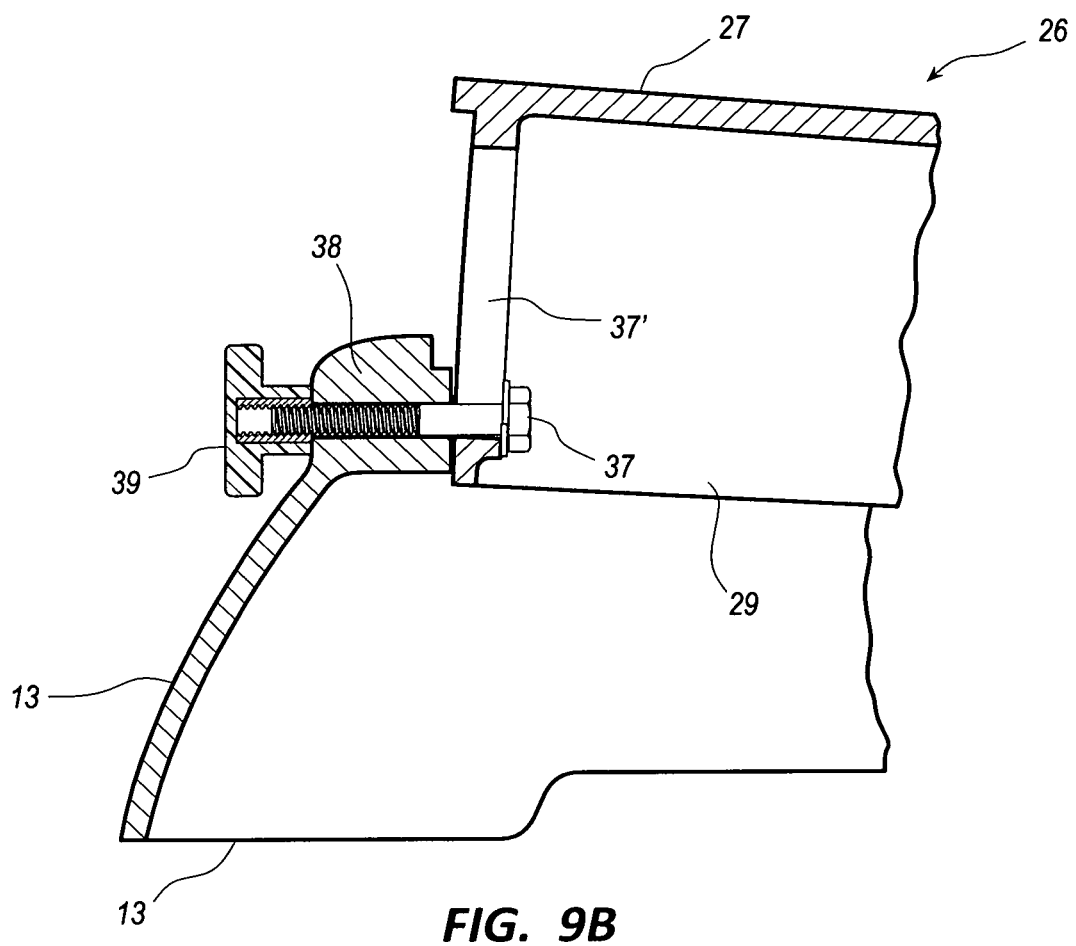
Figure 10:
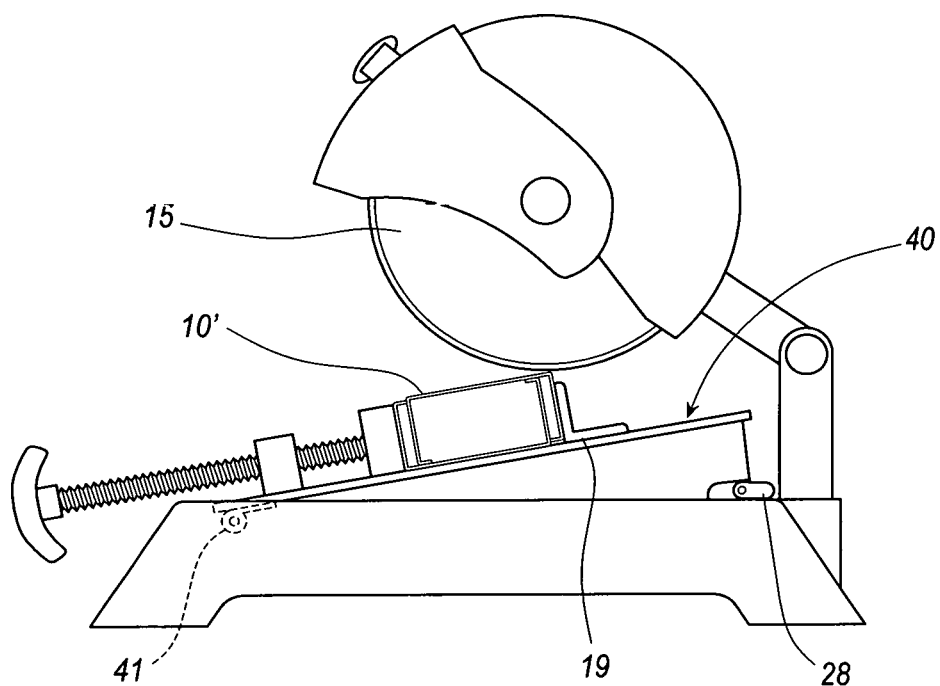

FIG. 1 Steel stud with web of stud indicated
FIG. 2 Shows components of a chop saw
FIG. 3 Chop saw wheel fully lowered, wheel extended into slot
FIG. 4A Chop saw initiating cut on a pair of narrow steel studs
FIG. 4B Chop saw initiating cut on a pair of wide steel studs
FIG. 5 Chop saw shown cutting angle iron
FIG. 6A Exploded view of preferred chop saw base and cutting deck
FIG. 6B Preferred embodiment side view; cutting deck elevated; initiating cut on steel stud
FIG. 7 Detail of flanged spindle and spindle bushing hinge
FIG. 8A Alternative embodiment chop saw base with rear-mounted hinge
FIG. 8B Side view of alternative embodiment chop saw with rear hinge
FIG. 9A Alternative embodiment deck support means; deck lowered
FIG. 9B Alternative embodiment deck support means; deck raised
FIG. 10 Alternative variable angle cutting deck with front-mounted hinge

DRAWINGS—REFERENCE NUMERALS

10 Stud—3⅝ inch to 4 inch
10' Six-inch and larger stud
11 Web of steel stud
12 Chop Saw
13 Chop saw base
13' Uppermost horizontal surface of base
14 Prior art chop saw cutting deck
15 Cutting wheel
16 Cutting wheel guard
17 Chop saw handle
18 Chop saw motor mount
18' Pivot point of motor mount
19 Fence
20 Clamp head
21 Clamp screw block
22 Clamp screw
23 Clamp handle
24 Cutting wheel slot
25 Angle iron
26 Variable angle cutting deck assembly
26' Chop saw base aperture
27 Planar deck surface
28 Deck support tabs
28' Deck support axle
29 Cutting deck safety skirt
29' Safety skirt detent
30 Flanged spindle
30' Spindle bore
31 Spindle fasteners
32 Spindle bushing
32' Bushing bore
36 Rear mount hinge
37 Tension bolt
37' Slot for tension bolt
38 Tension block
39 Threaded tension knob
40 Alternative cutting deck assembly
41 Front-mounted hinge

DETAILED DESCRIPTION—PREFERRED EMBODIMENT—FIGS. 6A, 6B, 7

FIG. 6A shows an exploded view of the present invention. A prior-art chop saw motor mount 18 having a pivot point 18' is fastened to a chop saw base 13 at the rear of the base, as shown. Base 13 has four substantially vertical sides, and a horizontal uppermost surface 13' (FIG. 6B) that defines a "plane of 0° inclination." A motor (not shown) is pivotally joined to motor mount 18. The pivotal movement of the motor defines a motor axis, which is perpendicular to the plane of 0° inclination.

The motor axis defines a longitudinal base axis, and a lateral base axis is perpendicular to the longitudinal base axis. A planar-faced abrasive disc, or wheel 15 having a circumferential edge is affixed to the motor so that the planar face is parallel to the motor axis. The chop saw base is modified with an aperture 26' through its uppermost surface 13' and is of sufficient size to accept a variable angle cutting deck assembly 26. The cutting deck assembly 26 comprises a planar deck surface 27 and a safety skirt 29. The skirt, comprising an end flange and two side flanges, extends from the underside edges of the cutting deck assembly and is perpendicular to deck surface 27, as shown. Skirt 29 is of sufficient size to protect the operator from sparks and from wheel 15 as it passes below surface 27 during cutting operations when the cutting deck is in raised configuration.

The cutting deck assembly 26 is connected to a hinge. The hinges of the preferred and alternative embodiments are made up of a fixed part and an active part pivotally joined together and defining a pivot axis around which the active part rotates. The active part of the hinges is attached to the cutting deck 26 and the fixed parts are connected to base 13 so that deck surface 27 is pivotally joined to the base along a pivot axis parallel to the lateral base axis. The hinges are of sufficient design so that the plane of deck surface 27 is capable of movement between two inclination angles. The two inclination angles define a range of motion between an angle congruent with the plane of 0° of inclination and an angle congruent with a raised, inclined orientation defining a plane of positive inclination, as shown in FIG. 6B.

Seen in FIGS. 6A and 7, the hinge of the preferred embodiment comprises flanged spindles 30 (correlating with the fixed hinge part) mounted into spindle bores 30' with spindle fasteners 31 at each side of the chop saw base 13. Spindles 30 mate into spindle bushings 32 (correlating with the active hinge part) that are fixed into bushing bores 32' located in each side flange of the safety skirt 29, as shown. The preferred pivot axis is located nearest the front edge of fence 19 just beneath deck surface 27 as in FIG. 6B.

The cutting deck assembly 26 further comprises voids of predetermined size and location (some not shown) by which to attach well-known, prior-art chop saw components. These components comprise a fence 19, a clamp head 20, a clamp block 21, a clamp screw 22 oriented along a longitudinal axis, as shown, and a clamp handle 23. A cutting wheel slot 24 is also a member of this group of voids. Slot 24 communicates with the cutting wheel so that a portion of wheel 15 may pass into the slot (as in FIG. 3) when the wheel is pivoted downward.

A deck support means is fitted to the deck assembly. The deck support means for the preferred and alternative embodiments support the deck surface at an inclined angle congruent with the plane of positive inclination, and precludes interference with the defined range of motion of the deck by also allowing the deck surface to be lowered to an angle orientation congruent with the plane of 0° inclination.

In the preferred embodiment, the deck support means comprise an assembly having a plurality of support tabs 28 which are positioned in detent areas 29' in the skirt 29, as shown in FIGS. 6A and 6B. A horizontal axle 28' under the cutting deck 27 between the tabs passes through skirt 29 and is connected to both tabs in such a fashion as to provide simultaneous movement of both tabs though contact with and manipulation of only one tab. Tabs 28 are positioned in their detents in such fashion that when deck 27 is raised and tabs 28 are swung outward in a deployed orientation away from the cutting deck skirt 27, their upward swing is stopped at a substantially horizontal position which allows them to extend over the top edge 13' of base 13 so that deck assembly 26 is adequately supported in raised position. Detents 29 are also of such sufficient size and location that when tabs 28 are swung downward into the detents and into a substantially vertical, stowed orientation, tabs 28 may descend freely into base 13 when deck 27 is lowered.

OPERATION—PREFERRED
EMBODIMENT—FIGS. 4B, 5, and 6B

When ineffective or inefficient cutting geometry is encountered with certain materials positioned on a horizontally oriented, or 0° inclination chop saw cutting deck as in FIG. 4B, the angle of inclination between the cutting wheel 15 and cutting deck 27 may be changed to an efficient angle congruent with the plane of positive inclination, as seen in FIG. 6B, so that the contact area between the edge of wheel 15 and the material is reduced. To change the cutting deck's angle of inclination, the clamp handle 23 is lifted, thereby tilting the front of the cutting deck assembly 26 upward. The deck assembly is raised to a sufficient height so that the cutting deck support tabs 28 may be deployed. The support tabs 28 are rotated outward and upward from detents 29'. Clamp handle 23 is released, deck assembly 26 stays in its raised position, and cutting may begin.

When an ineffective cutting geometry is encountered for certain material profiles when the cutting deck assembly 26 is in the raised position, the deck may be lowered to the horizontal orientation as in FIG. 5 by lifting clamp handle 23, rotating deck support tabs 28 into detents 29', and fully lowering cutting deck assembly 26 into base 13. The chop saw is now ready for cuts in the horizontal cutting orientation. Due to the preferred embodiment hinge style and hinge pivot axis location, elevation adjustments to supplemental supports are not required throughout the cutting deck range of motion.

Alternative Rear Hinge Mount—Description, FIGS. 8A, 8B

Description of this alternative embodiment is identical to the preferred embodiment, with the exception of the hinge pivot axis location and the hinge style. In FIGS. 8A and 8B, the chosen style of hinge 36 used is a well-known article of trade of the barrel, leaf, and pin style common to door hardware. The hinge pivot axis for hinge 36 is at the rear edge of aperture 26' and cutting deck assembly 26, as shown. Operation of this embodiment is identical to the preferred embodiment.

Alternative Front Hinge Mount—Description, FIG. 10

Description of this alternative embodiment is identical to that of the preferred embodiment, with the exception of the lateral hinge axis, the style of hinge, and the location of the deck support means. In FIG. 10, the alternative cutting deck assembly 40 is fastened to the base with hinge 41 located at the front of cutting deck assembly 40 in the location as shown. The style of hinge 41 is identical to that shown in FIG. 8A. The deck support means are located at the rear of the cutting deck assembly, as shown. Operation—To achieve deck inclination from a horizontal orientation, downward pressure is applied to the clamp handle, thereby raising the rear of deck assembly 40. Deck support tabs 28 are then deployed as with the preferred embodiment. The procedure is reversed to lower the deck to a horizontal orientation.

Alternative Deck Support Means—Description, FIGS. 9A, 9B

FIG. 9A shows an alternative "support clamp" style deck support means in lowered position. A threaded tension bolt 37 having a head end and a threaded end passes through a vertical slot 37' in the front of cutting deck safety skirt 29, as shown. Bolt 37 then passes through a block bore in tension block 38 of chop saw base 13, through a bore in the base and into a threaded knob 39. The quantity of alternate deck support means to be used are predetermined to provide sufficient support for the cutting deck in its raised position, as shown in FIG. 9B.

Operation—To raise deck 14 from horizontal orientation, knob 37 is loosened, clamp handle (not shown) is lifted until deck is fully raised, and clamp is tightened. Reverse procedure to lower the deck.

CONCLUSION, RAMIFICATIONS, AND SCOPE

Thus the reader will see that variable-angle cutting deck of the present invention provides a highly reliable device which enables reduction of the contact area between an abrasive disc and metallic stock, and, by thus reducing the associated friction, provides a way to reduce the physical effort required to cut various metal profiles and gauges, while also saving time, reducing consumption of natural resources, and lessening demand and wear on the chop saw's motor and bearings.

Although the above description contains many specificities, these should not be construed as limiting the scope of the invention but as merely providing illustrations of some of the presently preferred embodiments of this invention. Many other variations are possible. For example, a cutting deck assembly may be hinged directly to a chop saw base without an aperture formed into the base. In addition, various other styles of hinge mechanisms may be used to moveably connect the cutting deck assembly to the base. Likewise, other styles of support means may be used to support the cutting deck in an inclined orientation, such as pressure-actuated, spring-loaded pins through the chop saw base and into the safety skirt at predetermined locations, etc.

Thus, the scope of the invention should be determined by the appended claims and their legal equivalents, rather than by the examples given.

I claim:

1. A variable-angle cutting deck for reducing an elapsed time required for abrasive cutting of metal, said variable-angle cutting deck configured to be used with a metal-cutting chop saw; said metal-cutting chop saw of the type comprising
    (i) a chop saw base, said base comprising a substantially horizontal uppermost surface, said uppermost surface defining a plane of 0° inclination;
    (ii) a motor mount attached to said base, said motor mount comprising a pivot point;
    (iii) a motor, said motor pivotally joined to said motor mount so that said motor pivots along a motor axis, said motor axis being perpendicular to said plane of 0° inclination; said motor axis also defining a longitudinal base axis of said base;
    (iv) an abrasive disc mounted to said motor, said abrasive disc comprising a planar face and a circumferential edge, said planar face being oriented parallel to said motor axis, said abrasive disc pivoting with said motor so that said circumferential edge of said abrasive disc communicates with an elongated slot in a deck surface;
said variable-angle cutting deck comprising
    (a) a deck surface of a predetermined dimension capable of supporting a stock to be cut, said deck surface comprising
        (1) a single plane of rigid material having a longitudinal deck axis parallel to said longitudinal base axis and a lateral deck axis perpendicular to said longitudinal deck axis,
        (2) an elongated slot, said elongated slot being oriented in said deck surface so that said abrasive disc is capable of communicating with said elongated slot when said motor is pivoted along said motor axis; said elongated slot also being of a predetermined dimension capable of receiving at least a portion of said abrasive disc;
        (3) voids of predetermined size and in predetermined locations in said deck surface, said voids capable of receiving fasteners by which to mount a prior-art fence and prior art clamp components to said deck surface, said prior art clamp components comprising a threaded block; a threaded screw, said screw being threadedly mated with said block, said screw being of the type that is oriented substantially parallel to said deck surface and substantially parallel to said longitudinal deck axis; a head pivotally affixed to an end of said screw nearest said motor mount; and a handle pivotally affixed to an end of said screw opposite said head; said variable-angle cutting deck also comprising
    (b) at least one hinge, said hinge comprising
        (1) a hinge pivot axis, said hinge pivot axis oriented at a predetermined pivot axis location parallel to said lateral axis of said deck surface, and
        (2) a fixed part pivotally joined to an active part, said fixed part also being joined to said base and said active part also being joined to said variable-angle cutting deck at said predetermined pivot axis location so that said deck surface is capable of an orientation between two inclination angles, said two inclination angles defining a range of motion of said deck surface in relation to said plane of 0° inclination, said range of motion comprising angle values ranging between an angle substantially congruent with or less than said plane of 0° inclination and an angle congruent with a plane of positive inclination, said plane of positive inclination comprising a predetermined angle at which (i) a geometric relationship between said abrasive disc and said stock resting on said deck surface is altered so that an area of contact between said abrasive disc and said stock is reduced in comparison to an area of contact between said abrasive disc and an identical stock resting on said deck surface oriented at said plane of 0° inclination, and at which (ii) a frictional resistance between said abrasive disc and said stock resting on said deck surface is reduced during cutting operations in comparison to a frictional resistance between said abrasive disc and an identical stock resting on said deck surface oriented at said plane of 0° inclination, the reduction of said frictional resistance being to an extent that faster cuts may be made.

2. The hinge pivot axis of claim 1 wherein said predetermined pivot axis location is nearest an intersection of a front edge of said fence and said deck surface so that a consistent line of elevation is maintained across an axis parallel to said lateral axis of said deck surface throughout said range of motion.

3. The hinge pivot axis of claim 1 wherein said predetermined pivot axis location is nearest a rear edge of said deck surface.

4. The hinge pivot axis of claim 1 wherein said predetermined pivot axis location is nearest a front edge of said deck surface.

5. The chop saw base of claim 1 further including an aperture, said aperture located in said uppermost surface of said base and having a dimension capable of receiving said variable-angle cutting deck.

6. The variable-angle cutting deck assembly of claim 1 further including a safety skirt, said safety skirt extending from an underside perimeter edge of said cutting deck assembly and being substantially perpendicular to said deck surface, said safety skirt comprising an end flange and two side flanges.

7. The variable-angle cutting deck of claim 1 further including a deck support means for supporting said deck surface at an inclined angle, said inclined angle comprising an angle congruent with said plane of positive inclination, said deck support means also precluding interference with said range of motion by allowing said deck surface to be lowered to an angle orientation congruent with said plane of 0° inclination.

8. The variable-angle cutting deck of claim 7 wherein said deck support means comprise at least one support clamp, said support clamp comprising a base bore in a side of said base; a vertical slot in a flange of a safety skirt communicating with said base bore; a tension block between said base bore and said vertical slot, said tension block comprising a block bore; said block bore communicating with said slot and said base bore; a tension knob; and a tension bolt comprising a head end and a threaded end, said tension bolt being of a predetermined length so that said tension knob may be substantially threaded onto said threaded end after said threaded end is inserted into said slot and passes through said tension block and exits from said base bore so that tension of knob tightens said slot against said tension block of said base, so that said deck assembly may be frictionally retained at a predetermined inclination angle.

9. The variable-angle cutting deck of claim 7 wherein said deck support means comprise a tab support; said tab support comprising at least one tab; said tab being pivotally mounted to said variable-angle cutting deck so that said tab may pivot into orientations defined as a stowed orientation and a deployed orientation; said stowed orientation defined by said tab being pivoted into an orientation that allows said deck surface to be lowered to an inclination angle congruent with said plane of 0° inclination; said deployed orientation defined by said tab being pivoted into an orientation in which said tab contacts a predetermined surface of said base so that said deck surface is supported at an angle congruent with said plane of positive inclination.

10. The variable-angle cutting deck of claim 7 wherein said deck support means comprise pressure-actuated, spring-loaded pins located in said base and communicating with bores in a safety skirt, said bores being positioned at predetermined locations so that said pins engaged with said bores support said base at an inclination angle congruent with said plane of positive inclination.

\* \* \* \* \*